United States Patent
Kay

[15] 3,684,980
[45] Aug. 15, 1972

[54] HIGH EFFECTIVE ABSORPTION COEFFICIENT SOLID STATE LASER RODS

[72] Inventor: David Blair Kay, Rochester, N.Y.

[73] Assignee: Texas Instruments Incorporated, Dallas, Tex.

[22] Filed: Oct. 13, 1970

[21] Appl. No.: 80,422

[52] U.S. Cl. .................................... 331/94.5, 330/4.3
[51] Int. Cl. .............................................. H01s 3/06
[58] Field of Search ....................... 331/94.5; 330/4.3

[56] References Cited

UNITED STATES PATENTS

| | | | |
|---|---|---|---|
| 3,102,920 | 9/1963 | Sirons | 331/94.5 |
| 3,230,474 | 1/1966 | Keck et al. | 331/94.5 |
| 3,533,013 | 10/1970 | Seitz | 331/94.5 |
| 3,508,165 | 4/1970 | Nicolai | 331/94.5 |
| 3,284,722 | 11/1966 | Gray | 331/94.5 |

*Primary Examiner*—William L. Sikes
*Attorney*—James O. Dixon, Andrew M. Hassell, Harold Levine, Mel Sharp and René E. Grossman

[57] ABSTRACT

The effective absorption coefficient of solid state laser rod is increased by selectively coating the longitudinal surface of the laser rod or the rod cladding with a highly light reflective layer such that substantial portions of the light which passes unabsorbed through the rod is reflected back into the rod.

8 Claims, 6 Drawing Figures

INVENTOR
David Blair Kay

WITNESS        ATTORNEY

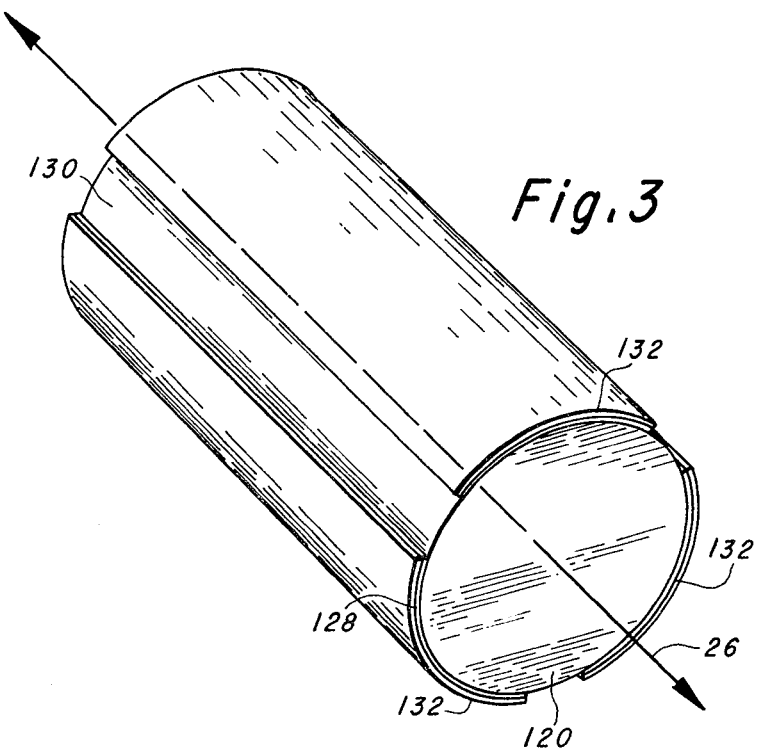
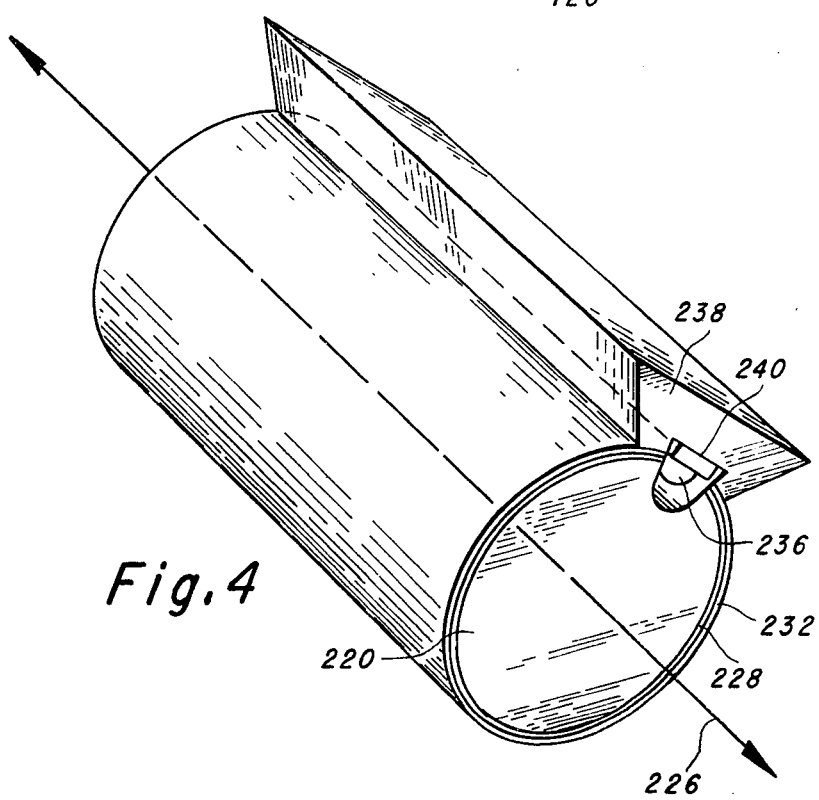

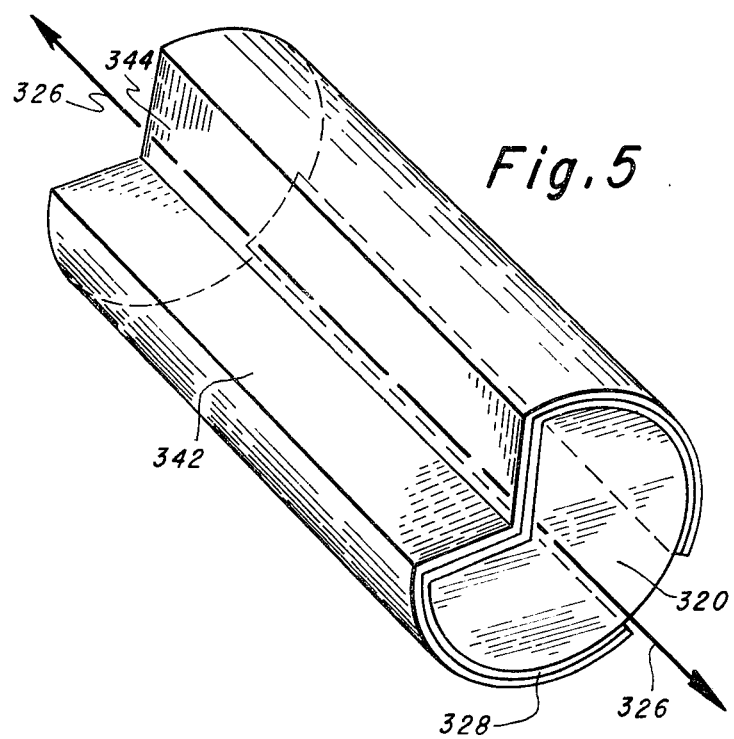
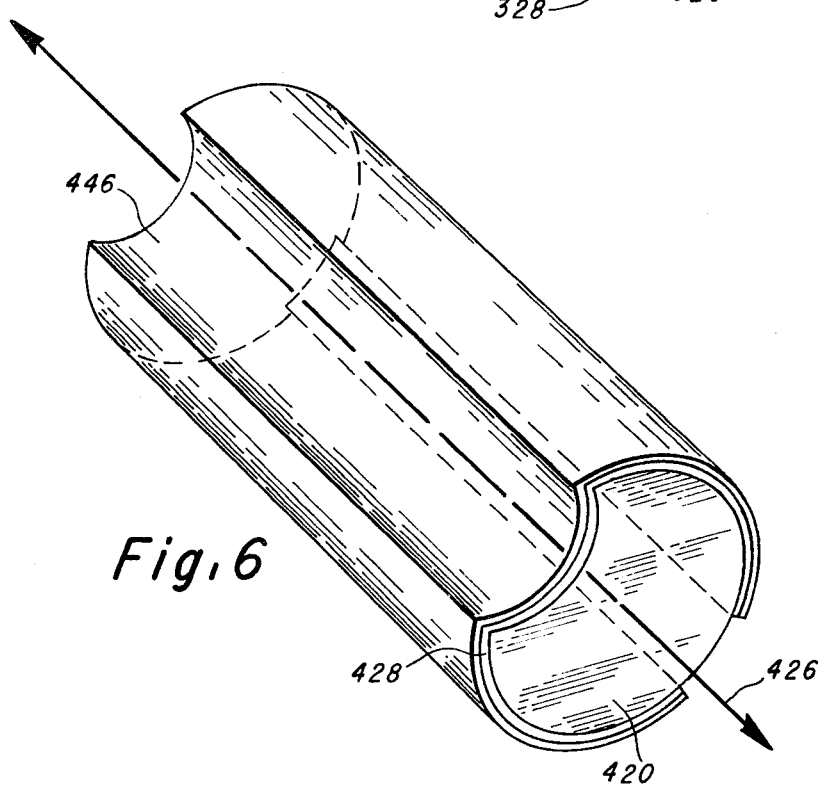

HIGH EFFECTIVE ABSORPTION COEFFICIENT SOLID STATE LASER RODS

BRIEF DESCRIPTION OF INVENTION AND BACKGROUND INFORMATION

This invention relates to lasers and more particularly to diode pumped solid state lasers.

At the present time a number of different lasers are known and in use. These include crystalline, liquid, glass and semiconductor lasers. Semiconductor lasers have many advantages, for example, small size and high reliability.

Many semi-conductor laser materials have relatively low coefficients of absorption. Since the light output of typical solid state light source is low, laser operation using a solid state rod and light source must be highly efficient if reasonable amounts of power are to be obtained therefrom. This high efficiency is obtained by providing a laser system with means to effect a multipass path for the pump light to promote absorption in the rod.

In accordance with one embodiment of this invention, a laser rod assembly is provided in which the rod is mounted concentrically with a laser rod cladding. The outer longitudinal surface of the cladding is highly polished and selected areas of the cladding are coated with a highly light reflective layer. The laser rod is pumped by illuminating the uncoated areas of the cladding with emitting diode arrays or other suitable light sources. Substantially all of the light passing unabsorbed through the rod impinges upon the highly light reflective surface and again passes through the rod in a multiple pass pattern thereby increasing the apparent absorption coefficient of the laser rod.

In accordance with another embodiment of this invention, a laser rod having multiple light path characteristics is provided by a laser rod in which the outer longitudinal surface is highly polished with selected portions coated with an adherent highly light reflective layer. The rod is pumped by illuminating the exposed portions of the longitudinal surface of the rod with diode arrays or other suitable light sources.

In still another embodiment of this invention, a laser rod is provided in which the outer longitudinal surface of the rod has formed therein one or more grooves with the longitudinal surface of the rod between the grooves being coated with a highly light reflective adherent coating. The pumping source providing the light is positioned substantially in the groves, thereby insuring that substantially all the light emitted by the light source passes through some portion of the laser rod before impinging on any portion of the laser cavity.

Other embodiments of the invention provide laser rods in which more uniform pumping of the laser rod is achieved by shaping portions of the longitudinal surface of the rod such that substantial portions of the light passing unabsorbed through the rod and impinging on highly light reflective coatings which have been formed on these surfaces is reflected such that it again passes through the rod but is scattered so as to avoid focusing the light near the center of the rod.

In each of the above embodiments, the light reflective surfaces can be further coated with a protective layer to protect these layers from adverse environments.

One object of the invention is to provide a multiple pass rod for solid state lasers.

Another object of the invention is to provide a laser rod assembly in which substantially all the light emitted by the pumping source passes through some portion of the laser rod before impinging upon the laser cavity.

Another object of the invention is to provide a laser rod cladding in which light unabsorbed during the first pass through the laser rod will be reflected back through the rod in a multiple pass pattern.

These and other objects and advantages of this invention will be obvious to those skilled in the art in view of the attached drawings and following detailed description.

BRIEF DESCRIPTION OF THE DRAWINGS

FIG. 3 is an isometric view of a solid laser rod.

FIG. 4 is an isometric view of a grooved laser rod and a diode array pump source.

FIG. 5 is an isometric view of a laser rod having a substantially triangular groove therein and a highly reflective coating on portions of the longitudinal surface.

FIG. 6 is an isometric view of a laser rod having a substantially semicircular groove therein with selected portions of the longitudinal surface covered with a highly light reflective layer.

DETAILED DESCRIPTION

Figure 1:
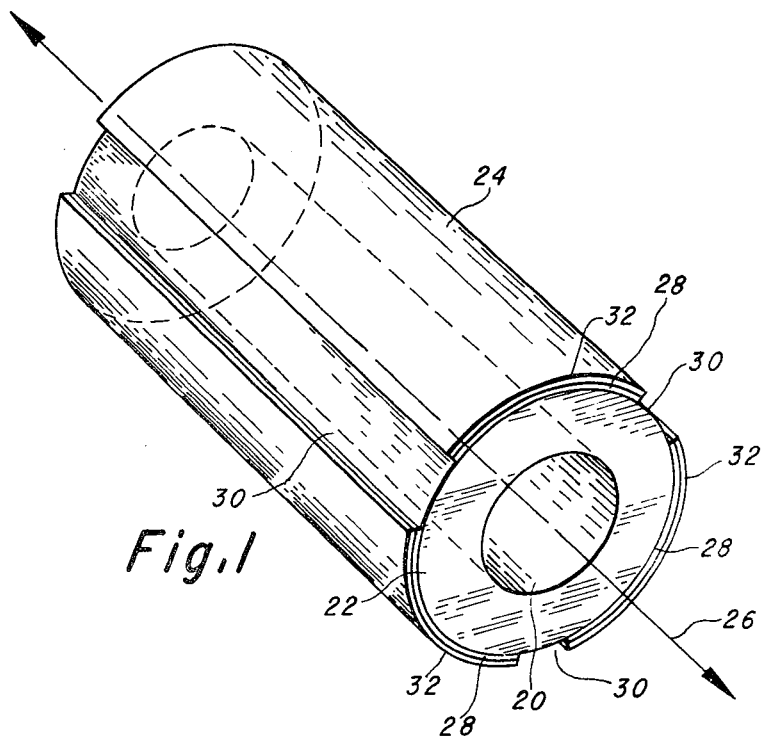
FIG. 1 is an isometric view of the laser rod assembly including a laser rod cladding.

FIG. 1 is an isometric view of a laser rod 20 and a cladding 22 mounted concentric therewith.

The laser rod 20 can be made of any suitable laser material, for example, neodyminum doped, yttrium aluminum garnet, commonly referred to as YAG. The cladding 22 can be made of any material having suitable optical qualities. The cladding material would preferably have a very low absorption coefficient for the wave lengths of the light used to pump the laser rod 20 and a relatively high index of refraction as compared to air. Cylindrical claddings made of material having these characteristics act as a lens for light entering the cladding 22 along the longitudinal surface 24 and tend to focus this light onto the laser rod 20. This assures that the laser rod 20 receives strong pumping along the longitudinal axis 26, thereby contributing to the overall stability of the laser operation.

The absorption coefficient of most laser materials, for example, YAG, is quite low and it is therefore difficult to achieve high coupling coefficients between the laser rod 20 and the pumping source (not shown in FIG. 1) without some structure which assures that substantial portions of the light which pass through the rod 20 unabsorbed is reflected back into the rod 20 along a multi-pass path.

Multiple pass characteristics are achieved in the laser rod assembly illustrated in FIG. 1 by forming on portions of the longitudinal surface of the cladding a layer 28 of a highly light reflective material. This layer forms strips on the outer surface with openings 30 between the edges of the strips. Light from the pump source enters the cladding and the laser rod through these openings 30. Any light entering the cladding through these openings 30 tends to be focused towards the laser rod by the lens effect of the cladding. Substantial portions of the light which passes through the rod 20 unabsorbed on the first pass is reflected by the reflective layer 28 on the longitudinal surface of the cladding such that it passes through the laser rod at least a second time. This process continues until the light is either absorbed by the rod or the cladding or emerges from the cladding through one of the openings 30. Light emerging from the cladding through the openings 30 will impinge either on the light source or some portion of the laser cavity (not shown in FIG. 1) where it is either reflected or absorbed. This multiple pass characteristic substantially increases the effective absorption coefficient of the laser rod.

In practice, it has been found to be convenient to coat the outer surface of the laser rod and the inner cylindrical surface of the cladding with glycerol [$C_3H_5(OH)_3$] to assure good optical and thermal coupling between the rod 20 and the cladding 22. Additionally, the reflective layer 28 may be coated with a second layer 32 for environmental protection.

Figure 2:
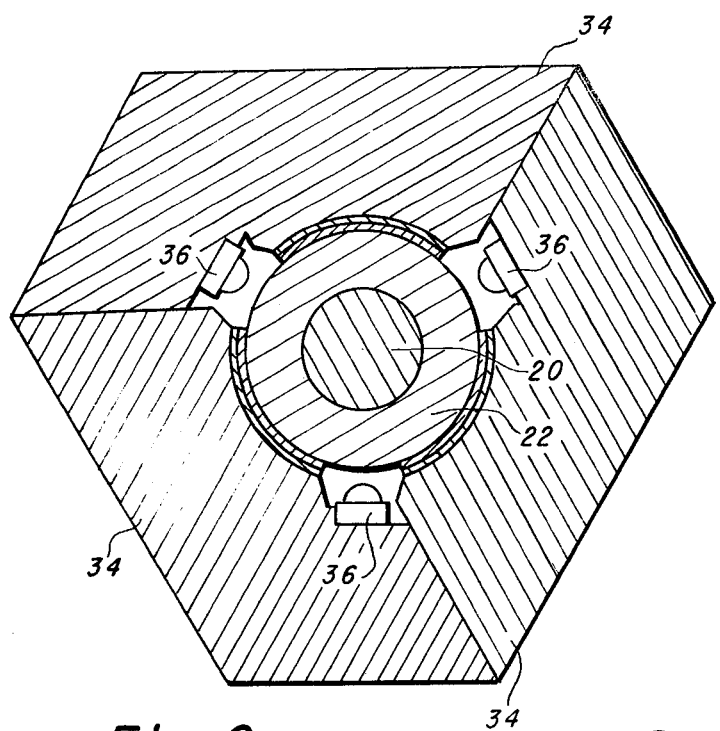
FIG. 2 is a cross section of a laser including a laser rod, a rod cladding and light emitting diode arrays.

FIG. 2 is a cross section view of laser rod of FIG. 1 including support members 34. The inner surfaces of the support members form a cavity. Additionally, supports 34 can be used as a heat sink for the rod 20 and the cladding 22. Alternately, the supports 34 can be cooled by passing a suitable coolant through passages formed within the supports 34.

FIG. 3 is a laser rod having a longitudinal axis 126 with portions of the outer surface substantially parallel to the longitudinal axis coated with a highly light reflective layer 128. Other portions of the longitudinal surface of the rod 120 are exposed through openings 130 in the layer 128. The laser rod 120 is pumped by light impinging upon the exposed longitudinal portions of the laser rod 120. Substantial portions of the light passing unabsorbed through the laser rod 120 will impinge on the light reflective layer 128 and be reflected back into the rod 120 along a multi-pass path. This process continues until the light is either absorbed by the laser rod 120 or emerges through one of the openings 130. Light emerging through openings 130 will impinge on either the light source or portions of the laser cavity (not shown) in which the laser rod is mounted where it will be either absorbed or reflected. This laser rod differs from the laser rod illustrated in FIG. 1 in that no cladding is used, the reflective coating being placed directly on the longitudinal surface of the laser rod 120.

FIG. 4 is another embodiment of this invention in which substantially all the light emitted by the pumping source will pass through some portion of the laser rod 220 before it impinges on any portion of the laser cavity. In this embodiment, the diodes are mounted on a support 238 which approximates a truncated prism with a substantially cylindrical groove in the surface formed by truncation. The diodes are mounted on a substantially flat surface 240 near the central portion of this cylindrical section and extend above the surface and into grooves formed in the laser rod 220. Other similar support members (not shown) may be used to complete the laser cavity. The longitudinal outer surface of the rod with the exceptions of the grooves is coated with a highly reflective layer 228 and a protective layer 232. Since the diode extends substantially below the outermost surface of the coated portions of the rod 220 substantially all the light emitted by the diodes will enter the laser rods prior to impinging on any portion of the support 238. As in previous embodiments substantial portions of the light passing through the rod unabsorbed during the first pass will impinge on one of the highly reflective surfaces and be reflected such that it passes through the rod 220 along a multi-pass path. This process continues until the light is either absorbed by the rod or emerges through the opening formed in the reflective layer 228 by the groove. Light emerging through the opening will impinge on either the light emitting diodes 236 or portions of the support 238 and will be either reflected or absorbed.

FIG. 5 is another embodiment of this invention wherein portions of the rod have been removed to form a groove having two surfaces 342 and 344 with each surface being a substantially flat plane with parallel edges thereby forming a "Y" shaped groove. The planes formed by removal of portions of the rod and other selected longitudinal portions of the rod are coated with a highly light reflective layer 328 selectively exposing the rod thereby forming an opening through which light from the pumping source enters. The opening is arranged such that substantially all of the light which passes unabsorbed through the rod during the first pass impinges upon one of the flat surfaces and is reflected such that it passes through another portion of the rod and impinges upon one of the curved portions of the reflective layer 328.

FIG. 6 is another embodiment of the laser rod 420 in which portions of the rod 420 have been removed to form a groove 446 which has the shape of a section of a circle. This groove 446 and other portions of the longitudinal surface of the rod 420 are coated with a highly light reflective layer 428 except for a small portion which forms an opening for light from the pump source to enter the laser rod. The opening and the semi-circular groove 446 are arranged such that substantially all of the light which passes unabsorbed through the laser rod during the first pass will impinge on the semi-circular surface formed by the groove 446 and be reflected through another portion of the laser rod.

The above-discussed laser rods can be neodyminum doped yttrium aluminum garnet, commonly referred to as "YAG" while the cladding 22 can be undoped "YAG." The longitudinal surfaces of the rods and the ends should be smoothed and polished for best results prior to forming the light reflective layer 28. Mirrors deposited on the ends of the rods or external mirrors may be used.

The light reflective layer may be gold, silver or other materials with good light reflecting properties. This layer may be formed by vacuum depositing a layer of silver, for example, over the longitudinal surface of the rod and selectively removing portions of this layer by photochemical techniques. Alternately, this layer may be formed by deposition through a suitable mask. The protective layer can be nichrome, gold or other materials which will adhere to the reflective layer and are relatively inert to the expected environment.

Suitable sources for the light emitting arrays include GaAsP, Ga AlAs, and GaAs light emitting diodes. The exact choice depends on the temperature and current at which the particular diodes are to be operated.

The above-discussed laser rods, light reflective and protecting layers can be formed using well known techniques while the light emitting diodes are standard, commercially available items. The disclosed rods, light reflective layers, and other features are examples only and it is contemplated that many variations therein may be made by those skilled in the art.

Although the invention has been described and defined in detail with reference to a preferred embodiment it will be obvious to those skilled in the art that many modifications can be made by those skilled in the art herein encompassed without departing from the contemplated scope of the invention described, defined and illustrated herein.

What is claimed is:
1. A laser rod assembly comprising in combination:
  a. a laser rod having substantially parallel first and second end surfaces and an outer surface substantially parallel to the longitudinal axis of said laser rod, and
  b. a light reflective coating selectively covering first portions of said outer surface while second portions of said outer surface are exposed, said covered and exposed portions extending substantially the entire length of said laser rod.
2. A solid state laser rod in accordance with claim 1 wherein said rod is YAG.
3. A solid state laser rod in accordance with claim 1 wherein the rod has been grooved along said exposed portion thereby permitting light emitting diodes to be mounted such that there is a minumum of light scattering before said light enters said rod.
4. A solid state laser rod in accordance with claim 1 wherein said highly light reflective coating is covered with a second coating, said second coating providing environmental protection for said highly reflective layer.
5. A solid state laser rod in accordance with claim 1 wherein said groove is V-shaped.
6. A solid state laser rod in accordance with claim 1 wherein said groove is semi-circular.
7. A laser rod assembly comprising in combination
  a. a laser rod and cladding mounted concentrically therewith, said laser rod and cladding being substantially equal in length and having first and second substantially parallel ends, and
  b. a light reflective coating selectively covering first portions of the outer surface of said cladding while second portions of said cladding are exposed, said covered and exposed areas substantially extending the entire length of said cladding.
8. A laser rod assembly in accordance with claim 7, wherein said highly reflective layer is silver.

* * * * *